US008594073B2

(12) United States Patent
Sugimoto et al.

(10) Patent No.: US 8,594,073 B2
(45) Date of Patent: Nov. 26, 2013

(54) METHOD AND APPARATUS FOR ROAMING BETWEEN COMMUNICATIONS NETWORKS

(75) Inventors: Shinta Sugimoto, Kanagawa (JP); Ryoji Kato, Kanagawa (JP); Toshikane Oda, Tokyo (JP)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 227 days.

(21) Appl. No.: 12/678,252

(22) PCT Filed: Sep. 20, 2007

(86) PCT No.: PCT/EP2007/060002
§ 371 (c)(1),
(2), (4) Date: Mar. 15, 2010

(87) PCT Pub. No.: WO2009/036806
PCT Pub. Date: Mar. 26, 2009

(65) Prior Publication Data
US 2010/0202383 A1    Aug. 12, 2010

(51) Int. Cl.
*H04L 12/66* (2006.01)
(52) U.S. Cl.
USPC .......................................................... 370/352
(58) Field of Classification Search
None
See application file for complete search history.

(56) References Cited

U.S. PATENT DOCUMENTS

| 6,091,732 | A |   | 7/2000 | Alexander, Jr. et al. |
| 6,137,791 | A | * | 10/2000 | Frid et al. ........................ 370/352 |
| 8,249,021 | B2 | * | 8/2012 | Nasielski et al. ............. 370/331 |
| 2006/0067271 | A1 | * | 3/2006 | Chen et al. ........................ 370/331 |
| 2007/0201469 | A1 | * | 8/2007 | Iyer et al. ........................ 370/391 |
| 2007/0206557 | A1 | * | 9/2007 | Iyer et al. ........................ 370/338 |
| 2007/0297377 | A1 | * | 12/2007 | McCann et al. ............. 370/338 |

FOREIGN PATENT DOCUMENTS

| CN | 1859412 A1 | 11/2006 |
| WO | WO 2004/112347 A1 | 12/2004 |

OTHER PUBLICATIONS

Gundavelli S et al. Proxy Mobile IPv6 draft-sgundave-mip6-proxymip6-02.txt. Internet Citation, Mar. 5, 2007, pp. 1-52.
Ghassemian M et al. Analyses of Addressing and QoS Approaches for Ad Hoc Connectivity with the Internet. Personal, Indoor and Mobile Radio Communications, 2003. PIMRC 2003. 14th IEEE Proceedings on Sep. 7-10, 2003, IEEE, Piscataway, NJ, USA, vol. I, Sep. 7, 2003, pp. 492-496.
Calhoun P et al. RFC 4004: Diameter Mobile IPv4 Application. Network Working Group Request for Comments vol. 4004 Aug. 2005, pp. 1-53.
Calhoun P, et al. Diameter Base Protocol. IETF RFC3588, Sep. 2003.
Rigney, et al. Remote Authentication Dial in User Service (RADIUS). IETF RFC2865. Jun. 2000.
Ohnishi et al. Mobile IPv6 AAA Problem statement. draft-ohnishi-mip6-aaa-problem-statement-00.txt. IETF [Online] Feb. 2004.

\* cited by examiner

*Primary Examiner* — Raj Jain

(57) ABSTRACT

There is provided a method of managing roaming of a Mobile Node in a Visited network. The Mobile Node is associated with a Home network. In the Visited network, a server selects a Gateway node for use by the Mobile Node based on selection criteria. The Gateway node is disposed between the Home network and the Visited network. The server then sends a message to an access node in the Visited network to which the Mobile Node is attached, the message identifying the selected Gateway node. This instructs the Mobile Node to communicate with its Home network via the selected Gateway Node.

16 Claims, 8 Drawing Sheets

METHOD AND APPARATUS FOR ROAMING BETWEEN COMMUNICATIONS NETWORKS

TECHNICAL FIELD

The invention relates to the field of roaming between communications networks

BACKGROUND

Mobile IP (MIP), which is described in IETF RFC 3344, allows users of mobile communications devices to move from one network to another whilst maintaining a permanent IP address, regardless of which network they are in. This allows the user to maintain connections whilst on the move. For example, if a user were participating in a Voice Over IP (VoIP) session and, during the session the user moved from one network to another, without MIP support the user's IP address may change. This would lead to problems with the VoIP session.

A Mobile Node (MN) is allocated two IP addresses: a permanent home address and a care-of address (CoA). The CoA is associated with a node in the network that the user is currently visiting. To communicate with the MN, packets are sent to the MN home address. These packets are intercepted by a Home Agent in the home network, which has knowledge of the current CoA. The Home Agent then tunnels the packets to the CoA of the MN with a new IP header, whilst preserving the original IP header. When the packets are received by the MN, it removes the new IP header and obtains the original IP header. The MN sends packets directly to another node via a foreign agent in the visited network. The foreign agent maintains information about visiting MNs, including the CoA of each visiting MN.

Proxy Mobile IP v6 (PMIPv6), IETF draft-sgundave-mip6-proxymip6-01, describes a Proxy Mobile Agent (PMA) function. This function emulates home link properties in order to make a MN behave as though it is on its home network and allows support for mobility on networks that would not otherwise support MIPv6.

A PMA is usually implemented at the access router. The PMA sends and receives mobility related signalling on behalf of a MN. When a MN connects to an access router having a PMA, the MN presents its identity in the form of a Network Access Identifier (NAI) as part of an access authentication procedure. Once the MN has been authenticated, the PMA obtains the user's profile from a policy store. The PMA, having knowledge of the user profile and the NAI, can now emulate the MN's home network. The MN subsequently obtains its home address from the PMA. The PMA also informs the MN's Home Agent of the current location of the MN using a Binding Update message. The Binding Update message uses the NAI of the MN. Upon receipt of the Binding Update message, the Home Agent sets up a tunnel to the PMA and sends a binding acknowledgement to the PMA. On receipt of the Binding Acknowledgement, the PMA sets up a tunnel to the Home Agent. All traffic from the MN is routed to the Home Agent via the tunnel.

The Home Agent receives any packet that is sent to the MN, and forwards the received packet to the PMA through the tunnel. On receipt of the packet, the PMA removes the tunnel header and sends the packet to the MN. The PMA acts as a default router on the access link. Any packets sent from the MN are sent via the PMA to the Home Agent, which then sends the packet on to its ultimate destination.

It is possible for a MN to roam from one Proxy MIP domain to another. In the example illustrated in FIG. 1, a MN roams from a Home Proxy MIP domain to a visited Proxy MIP domain. To ensure continuity for any sessions that the MN is currently participating in, the MN continues to use its Home Agent (HAh) rather than the Home Agent (HAv) in the Visited Proxy MIP domain, even though the PMA that serves the MN is in the visited domain. In this case, the PMA serving the MN is PMA1$v$ once the MN has moved to the Visited domain.

According to the current PMIPv6 specification, in order for roaming to occur, a tunnel (illustrated in FIG. 1 by a dotted line) is established between the Home Agent HAh and the PMA (in this case, PMA1$v$) serving the MN in the visited domain. In order to establish a tunnel, a trust relationship is required between HAh and PMA1$v$. A problem occurs in the roaming scenario, because HAh and PMA1$v$ belong to different Proxy MIP domains. It is possible to establish a trust relationship between HAh and PMA1$v$. However, this leads to scalability problems, as this would require all HAs in all Proxy MIP domains to have a trust relationship with all PMAs in all Proxy MIP domains in advance of any roaming, which is impractical.

Another problem with roaming between Proxy MIP domains occurs when the Home Proxy MIP domain is in a closed network. A closed network may, for example, be protected by a firewall. This situation is illustrated in FIG. 2. In this case, establishing a tunnel between HAh and PMA1$v$ is impossible unless the firewall between the two networks recognizes that PMA1$v$ is trusted by HAh. The firewall would therefore need to be aware of all of the trust relationships between HAs and PMAs in all Proxy MIP domains.

SUMMARY

The inventors have realized the problems associated with establishing trust relationships between network nodes in different domains, and devised apparatus and methods to reduce these problems.

According to a first aspect of the invention, there is provided a method of managing roaming of a Mobile Node in a Visited network. The Mobile Node is associated with a Home network. A server disposed in the Visited network selects a Gateway node disposed between the Home network and the Visited network for use by the Mobile Node. The selection is based on selection criteria. Once the Gateway node has been selected, the server sends a message to an access node in the Visited network to which the Mobile Node is attached, the message identifying the selected Gateway node. An advantage of the method when used in a Proxy-MIP network is that there is no need for a Proxy Mobile Agent to establish a trust relationship with Home Agents in other networks. The method also allows a Mobile Node to maintain secure association with its Home Network, even when the Mobile Node is roaming in a closed Visited network. The method can also be used to select a Mobile Anchor Point for use by a Mobile Node in a Hierarchical MIPv6 network.

As an option, the server is an Authentication, Authorization, and Accounting server. In this way, bootstrapping of the Gateway node can be done as part of a normal authentication procedure.

In the case where the invention is implemented in a Proxy-MIP network, the Gateway node is a Proxy Mobile IP Gateway node, and the access node is a Proxy Mobile Agent.

The invention optionally comprises, prior to selecting a Gateway node, receiving an authorization message from an Authentication, Authorization, and Accounting server disposed in the Home network. The authorization message comprises an identifier identifying a Home Agent in the Home network. The identifier is changed to identify the selected Gateway node, and the authorization message with the changed identifier is sent to the access node.

Any suitable selection criteria for selecting the Gateway node can be used. These optionally include any of a trust between the Gateway node and the Home network, and the distance between the access node and the Gateway node.

Whilst the functions of a Gateway node are optionally be implemented in a single box, the functions of the Gateway node are optionally distributed between the Home network and the Visited network. In this instance, the selection criteria comprise selection of individual functions. If this is the case and the Gateway node is a Proxy Mobile IP Gateway node, then the functions may include a Home Agent emulation function and a Proxy Mobile Agent function.

In the case of a Hierarchical Mobile IP network, the Gateway node is optionally a Mobility Anchor Point and the access node is an Access Router.

According to a second embodiment of the invention, there is provided an Authentication, Authorization, and Accounting server for use in a communication network. The server comprises means for selecting a Gateway node disposed between a Home network and a Visited network based on selection criteria, and a transmitter for sending a message to an access node in the Visited network, the message identifying the selected Gateway node.

In a Proxy MIP network, the server optionally further comprise a receiver for receiving an authorization message from an Authentication, Authorization, and Accounting server disposed in the Home network, the authorization message comprising an identifier identifying a Home Agent in the Home network. Means are provided for changing the identifier to identify the selected Gateway node, and so the message sent to the access node is the authorization message with the changed identifier.

In the case of a Hierarchical Mobile IP network, the server optionally comprises a receiver for receiving an authorization message from a Home Authentication, Authorization, and Accounting server disposed in the Home network. The server further comprises means for selecting a Mobility Anchor Point for use by a Mobile Node attached to network served by the Authentication, Authorization, and Accounting server, and means for adding an Attribute Value Pair identifying the Mobility Anchor Point to the authorization message prior to transmitting it to the access node in the Visited network. In this way a Mobile Node can be provisioned with a Mobility Anchor Point during the authentication process.

According to a third aspect of the invention, there is provided a Gateway node for use in a Proxy Mobile IP network. The Gateway node has a receiver for receiving a registration request sent from an Authentication, Authorization, and Accounting server in a visited network. The request comprises an identifier of a home network or a Mobile Node. The receiver is also for receiving a binding update message sent from a Proxy Mobile Agent in the visited network, the binding update message comprising an identifier of the home network or Mobile Node. A processor is provided for associating the registration request with the binding update message using the identifier of the home network or Mobile Node. By associating the two messages, the Gateway Node can set up a roaming environment for the Mobile Node and the Proxy Mobile Agent.

DETAILED DESCRIPTION

Figure 1:
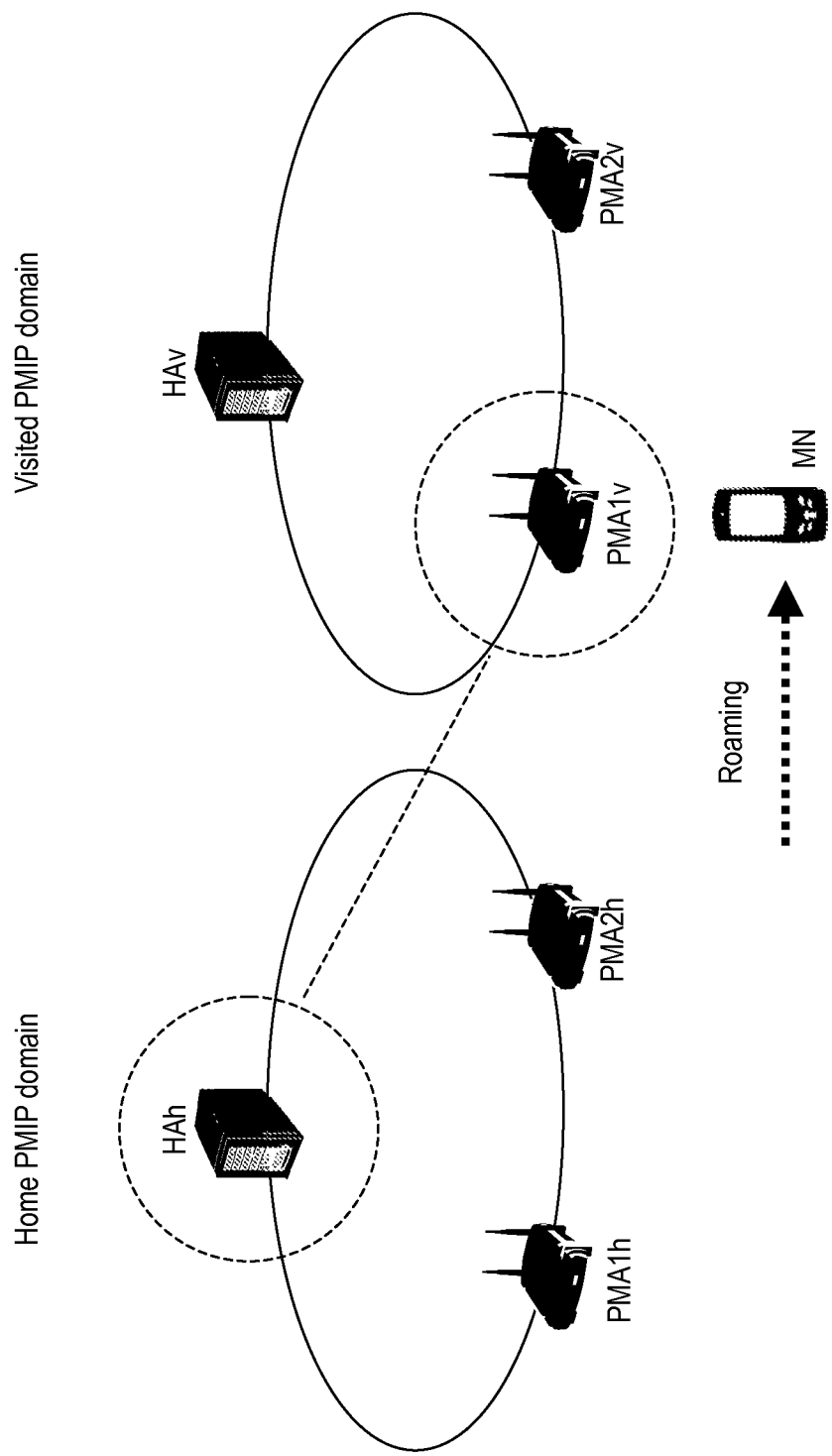
FIG. 1 illustrates schematically in a block diagram a Mobile Node roaming from a Home Proxy MIP domain to a visited Proxy MIP domain.
Figure 2:
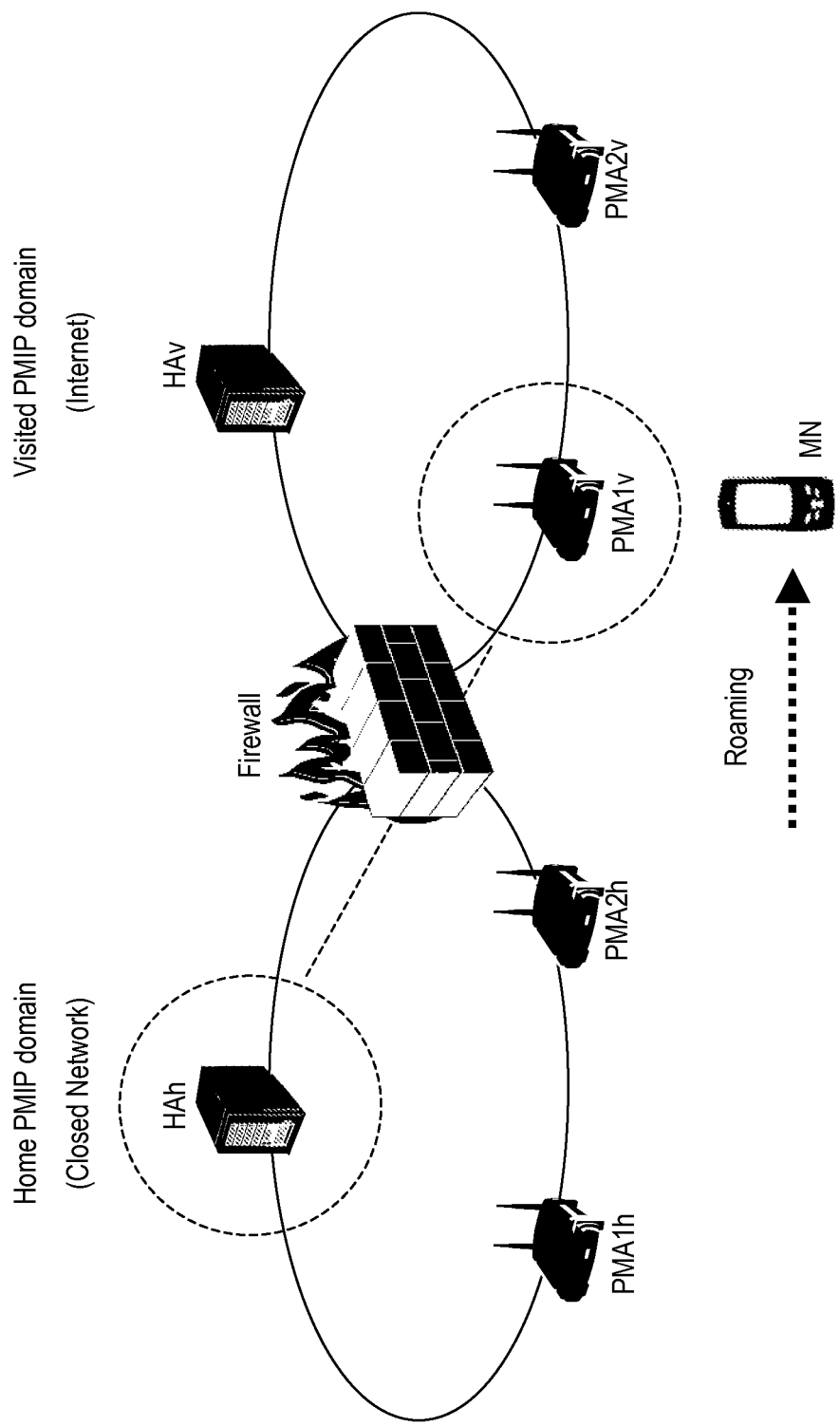
FIG. 2 illustrates schematically in a block diagram a Mobile Node roaming from a Home Proxy MIP domain to a visited Proxy MIP domain, where the Home Proxy MIP domain is protected by a firewall.
Figure 3:
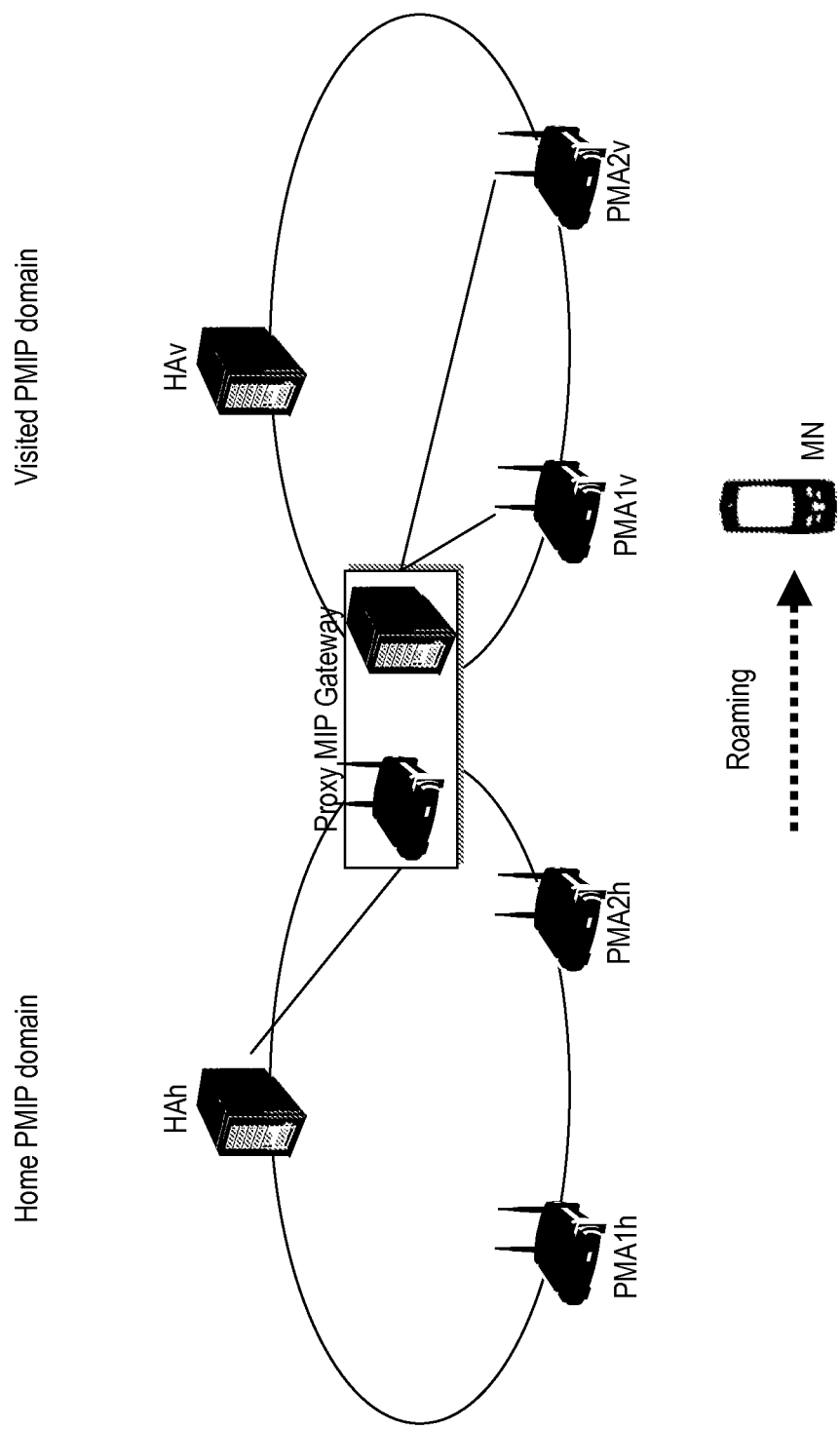
FIG. 3 illustrates schematically the architecture of a Home Proxy MIP network and a Visited Proxy MIP, having a Proxy MIP Gateway disposed at an interface between the two Proxy MIP networks.

Referring to FIG. 3, a Proxy MIP Gateway is introduced at an interface between a Home Proxy MIP domain and a Visited Proxy MIP domain. The Proxy MIP Gateway emulates both a Home Agent (HA) which is local to one domain, and a Proxy Mobile Agent (PMA) which is local to the other domain. In order to implement a Proxy MIP Gateway, the owners of the two networks must agree to place a Proxy MIP Gateway at the border between the networks. The Proxy MIP Gateway belongs to both the Home Proxy MIP domain and the Visited Proxy MIP domain. It may be implemented as a single physical box or may be implemented as distributed functions over each network.

In the example of FIG. 3, where the Mobile Node (MN) has roamed from the Home domain to the Visited domain, the Proxy MIP Gateway behaves as a PMA in the Home Proxy MIP domain and as a HA for the Visited Proxy MIP domain. The PMA must therefore provide the same interfaces to the HA in the Home Proxy MIP domain as PMA1$h$ and PMA2$h$ provide, and similarly it must provide the same interfaces in the Visited domain as a Home Agent (HAv) provides to the PMAs in the Visited network.

All traffic sent to or from the roaming MN in the Visited Proxy MIP domain traverses the Proxy MIP Gateway. As the traffic traverses the Proxy MIP Gateway, a firewall at the Home domain can discern the traffic from the roaming MN from other traffic, and therefore knows that it need not apply the normal firewall policies that would be applied to normal IP traffic that does not arrive from a trusted source. In order to do this, the firewall need only trust the PMA Gateways within the Home network, rather than all PMAs in all Proxy MIP networks.

When a MN is roaming in a Visited network, it is necessary to select the most relevant Proxy MIP Gateway for use by the roaming MN. Provisioning of the Proxy MIP Gateway can be done statically, but this is extremely inefficient and resource intensive. It is therefore better for provisioning of the PMAIP Gateway to be done dynamically.

Figure 4:
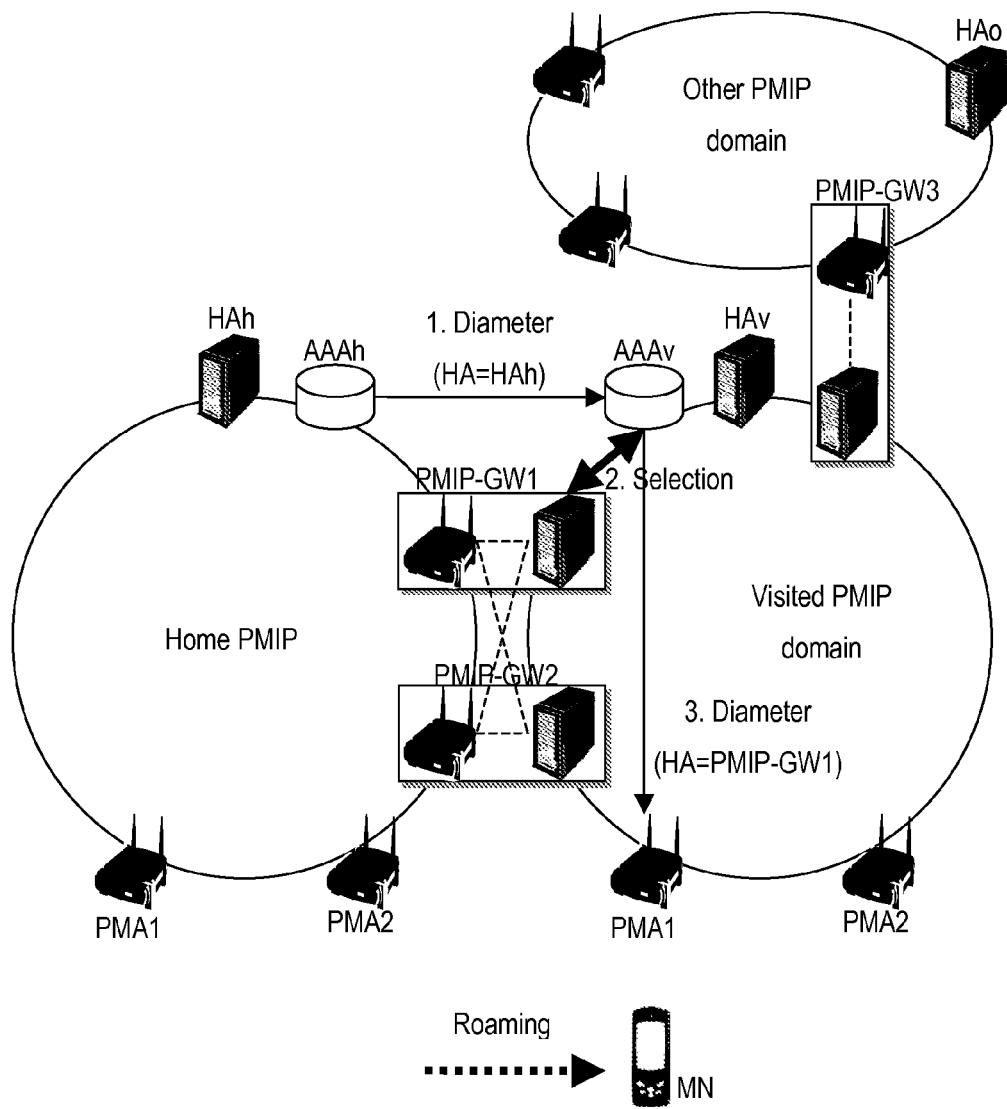
FIG. 4 illustrates schematically in a block diagram the dynamic allocation of a Proxy MIP Gateway to a roaming Mobile Node.

Referring to FIG. 4, there is illustrated schematically the dynamic allocation of a Proxy MIP Gateway to a roaming Mobile Node. In this example, there are three Proxy MIP domains, a Home Proxy MIP domain, a Visited Proxy MIP domain, and an Other Proxy MIP domain. There are also illustrated three Proxy MIP Gateways. PMIP-GW1 and PMIP-GW2 belong to both the Home Proxy MIP domain and the Visited Proxy MIP domain, and PMIP-GW3 belongs to both the Visited Proxy MIP domain and the Other Proxy MIP domain.

If a MN roams into the Visited Proxy MIP domain, it is important that PMIP-GW1 or PMIP-GW2 is selected, as these Proxy MIP Gateways have a trust relationship with the Home Agent HAh in the Home Proxy MIP domain, whereas PMIP-GW3 does not have that trust relationship. Similarly, PMIP-GW1 and PMIP-GW2 should not be selected for any Mobile Nodes that roam from the Other Proxy MIP domain to the Visited domain, because PMIP-GW1 and PMIP-GW2 do not have a trust relationship with the Home Agent HAo in the Other Proxy MIP domain.

In order to select a suitable Proxy MIP Gateway for a MN, an Authentication, Authorization and Accounting (AAA) proxy server in the visited network in which the MN is roaming is used. AAA servers are entities that provide IP functionality to support the functions of Authentication, Authorization and Accounting. AAA servers are specified in the RADIUS protocol (see C. Rigney, S. Willens, A. Rubens, W. Simpson, "Remote Authentication Dial In User Service (RADIUS)", IETF RFC2865, 2000-06) and the DIAMETER protocol (see. P. Calhoun, J. Loughney, E. Guttman, G. Zorn, J. Arkko, "Diameter Base Protocol", IETF RFC3588, 2003-09). AAA servers reside in both the Home Proxy MIP domain and the Visited Proxy MIP domain. The AAA server (AAAh) in the Home Proxy MIP domain functions as an authentication server, and the AAA server (AAAv) in the Visited Proxy MIP domain functions as a proxy server.

The PMIPv6 specification specifies that the AAA server AAAh authorizes the PMIPv6 HA of the PMA (and Home Address or Home Network Prefix) within an AAA session. In step 1 of FIG. 4, AAAh sends a Diameter message to AAAv with an indication that HAh is the PMIPv6 home agent for the MN. AAAv, in its capacity as an AAA proxy server, selects 2 a Proxy MIP Gateway (in this case PMIP-GW1) based on a specified set of criteria and then informs 3 the PMA (in this case PMA1v) of the selected Proxy MIP Gateway.

The selection criteria used by AAAv must include the selection of a Proxy MIP Gateway that belongs to the MN's Home Proxy MIP domain. Other criteria may be based on, for example, the geographical location of the Proxy MIP Gateway, load balancing in the network, or any other criteria decided upon by the network operator.

In the example of FIG. 4, either PMIP-GW1 or PMIP-GW2 could be selected for the MN, as they are both trusted by HAh. PMIP-GW1 is therefore selected on the basis of other criteria, for example because PMIP-GW1 is topologically closer to PMA1v than PMIP-GW2.

As shown in FIG. 4, AAAv changes the value of the PMIPv6 Home Agent indicator in the Diameter message to PMA1v from "HAh" to "PMIP-GW1". Based on the information identifying the selected Proxy MIP Gateway provided by this mechanism, PMA1v sends a Proxy Binding Update (BU) to PMIP-GW1, and then PMIP-GW1 sends the Proxy BU to HAh.

The AAA proxy server need not select a Proxy MIP Gateway if the PMIPv6 HA and PMA have a trust relationship and establish a tunnel between them. In such cases, the AAA server in the Visited Proxy MIP domain works as AAA relay server, and not an AAA proxy server. In this instance, it will route the AAA messages to other AAA nodes, without modifying AAA messages.

The AAA proxy server (AAAv) can be said to "bootstrap" the Proxy MIP Gateway within the visited domain during the end-to-end authentication procedure of the MN with its home AAA server (AAAh). Bootstrapping is a procedure to provision the gateway so that it can offer network services to the authenticated MN. Note that in conventional technologies, AAAh plays the primary role in bootstrapping the network entities including those in visited network domain.

The AAA proxy server (AAAv) also notifies the AAA authenticator of the profile of the selected gateway. Since AAAv makes the decision of gateway selection, it is necessary for the AAA authenticator to be aware of the selected gateway in order to perform access control and maintain keying materials for a given MN.

Figure 5:
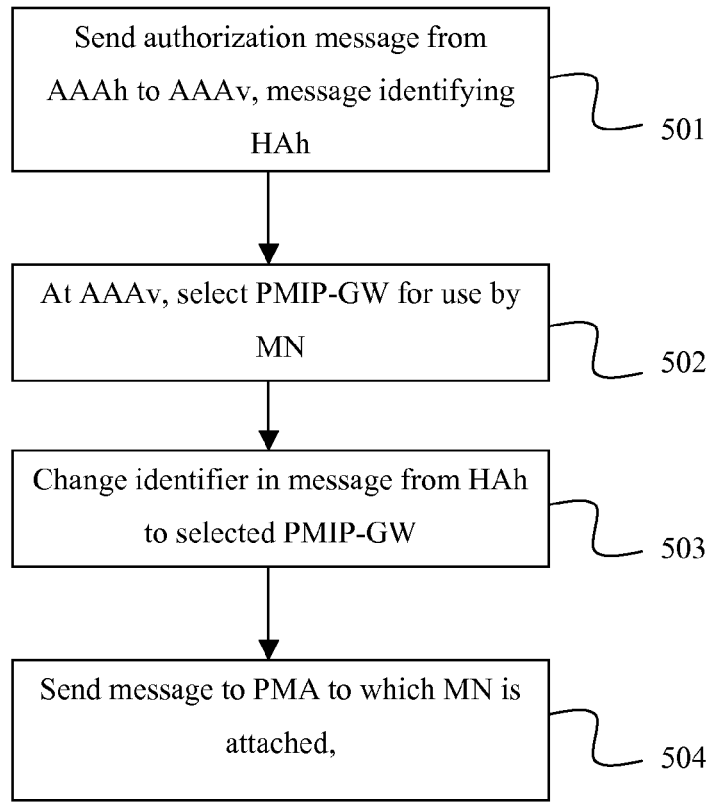
FIG. 5 is a flow diagram illustrating the steps for selecting a Proxy MIP Gateway according to an embodiment of the invention.

The basic steps for selecting a Proxy MIP Gateway are illustrated in FIG. 5. In step 501, as part of the normal authorization procedure when a MN roams into a Visited network, AAAh sends and authorization message to AAAv. The message identifies the Home Agent in the home network, HAh. AAAv selects 502 which Proxy MIP Gateway should be used by the Mobile Node, and changes 503 the identifier in the message from HAh to an identifier identifying the selected Proxy MIP Gateway. The message is then sent 504 to the PMA to which the MN is attached.

Figure 6:
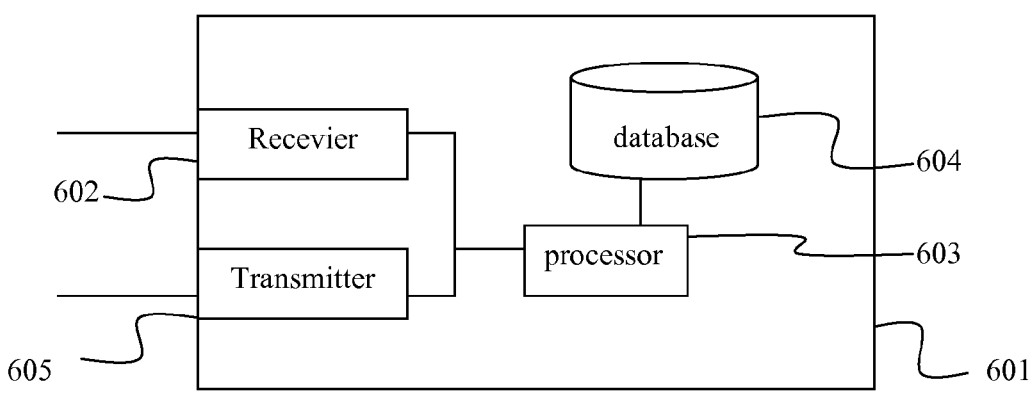
FIG. 6 illustrates schematically in a block diagram an Authentication, Authorization, and Accounting server according to an embodiment of the invention.

Referring to FIG. 6, the basic components required by AAAv are illustrated. AAAv 601 comprises a receiver 602 for receiving the message from AAAh, and a processor 603 for selecting a Proxy MIP Gateway. The selection may require use of information from a database 604, which may or may not be disposed at AAAv. The processor 603 is also used to alter the identity in the message from HAh to that of the selected proxy MIP Gateway. AAAV 601 further comprises a transmitter 605 for sending the message on to the PMA to which the MN is attached.

Figure 7:
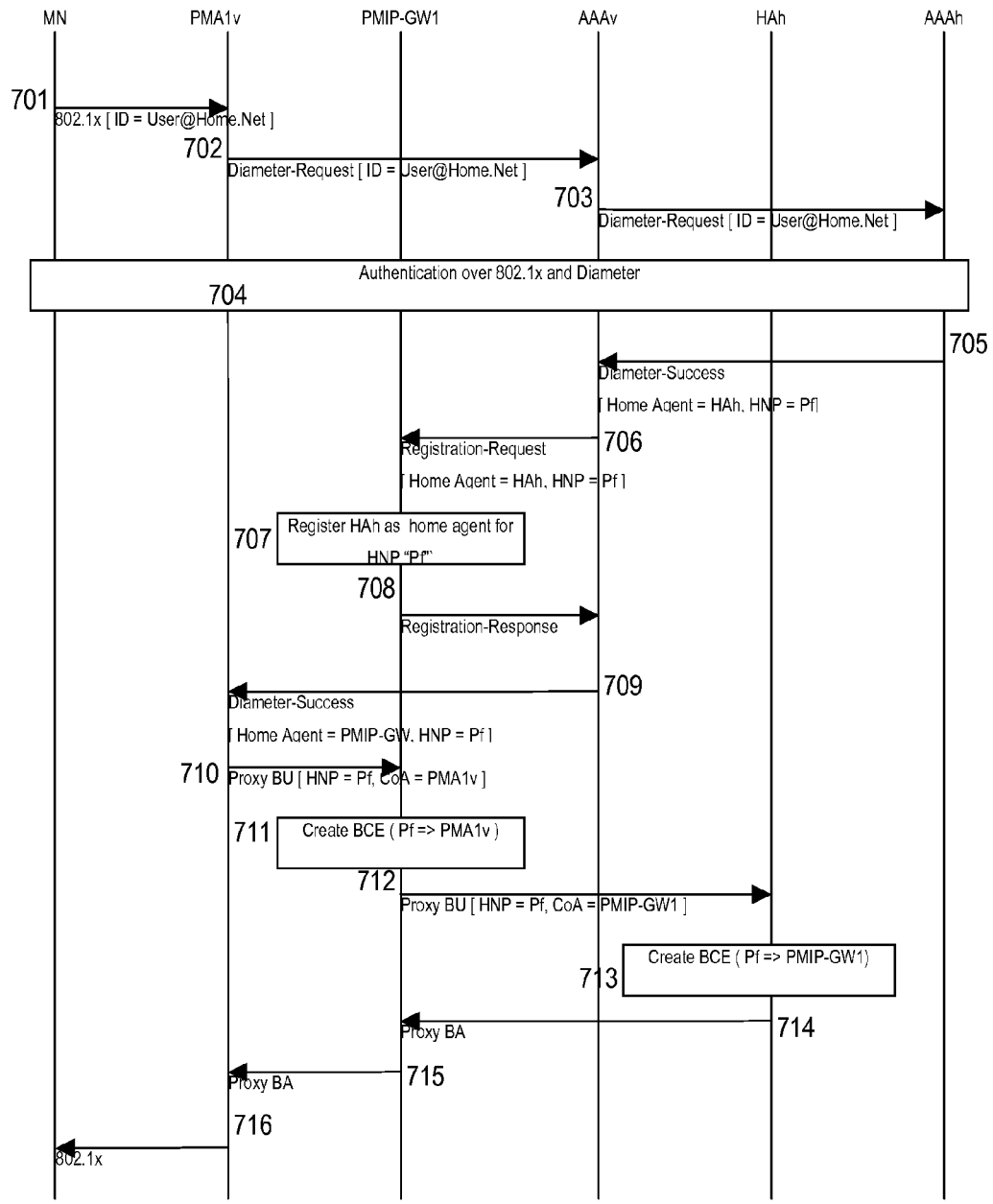
FIG. 7 is a signal flow diagram showing the signalling between the nodes illustrated in FIG. 4.

Referring to FIG. 7, there is shown a signal flow diagram showing the signalling between the nodes illustrated in FIG. 4.

The MN has an account with the Home Proxy MIP domain, and an identifier such as User@Home.Net. "Home.Net" represents the network of the Home Proxy MIP domain in this example. The front-end AAA protocol (between the MN a PMA) is 802.1x, and the back-end AAA protocol (between a PMA and an AAA server) is Diameter. Of course, other protocols may be used, for example PPP, PANA, or IKEv2 instead of 802.1x, and Radius instead of Diameter. The PMAs in the Visited Proxy MIP domain are assumed to forward all Diameter-Request messages to the local AAA server (AAAv).

The signalling sequence is as follows, with the numbering referring to the numbering of FIG. 5.

701) When the MN moves to the Visited Proxy MIP domain, the MN sends 4 a 802.1x message to PMA1v as an authentication request. "User@Home.Net" is specified as the identifier in the 802.1x packet.

702) When receiving the 802.1x packet from the MN, PMA1v sends a Diameter-Request message to AAAv. The Request includes the authentication data specified in the received 802.1x packet.

703) AAAv forwards the Diameter-Request message to AAAh. AAAv obtains the identity of AAAh from the domain part of the identifier "User@Home.Net".

704) AAAh authenticates the MN.

705) After successful authentication, AAAh sends a Diameter-Success message to AAAv. The Home Agent is set to "HAh", and Home Network Prefix (HNP) assigned to the Mobile Node is set to "Pf".

706) After receiving the Diameter-Success message from AAAh, AAAv selects PMIP-GW1 as the Proxy MIP Gateway for the MN, because PMIP-GW1 has a tunnel (i.e. trust relationship) with HAh. AAAv sends a Registration-Request message to PMIP-GW1 that includes an indication to register "HAh" as the HA for the Home Network Prefix "Pf". The protocol for conveying the Registration-Request can be any suitable protocol, for example Diameter, COPS, SNMP.

707) After receiving the Registration-Request message from AAAv, PMIP-GW1 registers "HAh" as a HA for the Home Network Prefix "Pf". This registration is used later in the step 12 in order to identify "HAh" as the HA for the Home Network Prefix "Pf".

708) PMIP-GW1 sends a Registration-Response message to AAAv.

709) AAAv sends a Diameter-Success message to PMA1v. The value of the Home Agent indicator is set to "PMIP-GW1".

710) PMA1v sends a Proxy Binding Update (PBU) to PMIP-GW1, which indicates that the Home Network Prefix is "Pf" and the Care-of Address (CoA) is "PMA1v".

711) After receiving the PBU from PMA1v, PMIP-GW1 creates a binding cache entry (BCE) for Home Network Prefix "Pf". The CoA of this entry is "PMA1v".

712) PMIP-GW1 sends a PBU to HAh, because "HAh" is registered as the HA for "Pf" (see step 7). The CoA of this PBU is "PMIP-GW1".

713) After receiving the PBU from PMIP-GW1, HAh creates a binding cache entry (BCE) for Home Network Prefix "Pf". The CoA of this entry is "PMIP-GW1".

714) HAh sends a Proxy Binding Acknowledgement (PBA) to PMIP-GW1.

715) PMIP-GW1 sends a PBA to PMA1v.

716) PMA1v sends a 802.1x message to the MN indicating the successful result.

After this procedure, PMA1v performs as the default router for the MN as specified in IETF draft-sgundave-mip6-proxymip6-01.

Downlink packets bound for the MN are delivered to HAh, and then forwarded to PMIP-GW1, because HAh has a BCE for Pf (MN) whose CoA is PMIP-GW1. The packets are then forwarded to PMA1v because PMIP-GW1 has a BCE indicating that the CoA of Pf (MN) is PMA1v. The packets are finally forwarded to the MN.

Uplink packets from the MN are delivered to PMA1v, then forwarded to PMIP-GW1, then to HAh, and finally forwarded to the destination address.

Figure 8:
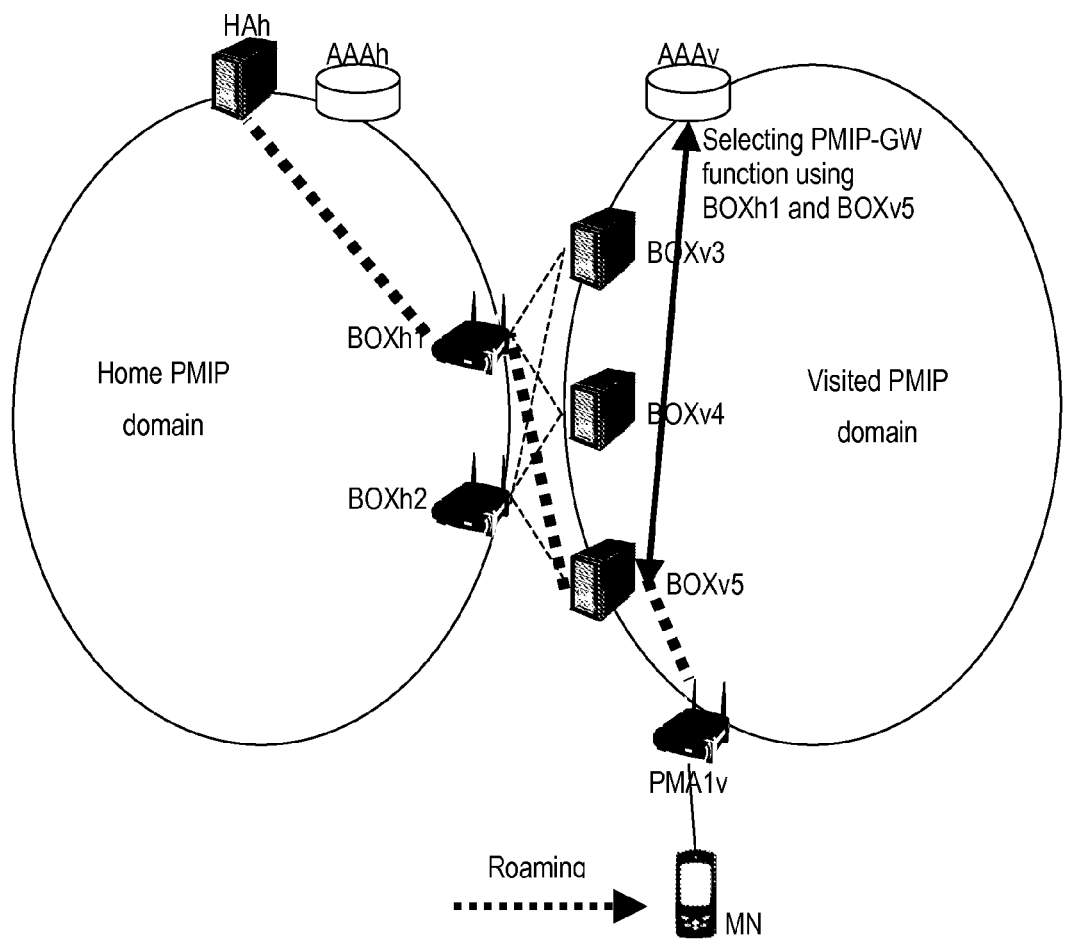
FIG. 8 illustrates schematically the architecture of a Home Proxy MIP network and a Visited Proxy MIP, having a Proxy MIP Gateway disposed at an interface between the two Proxy MIP networks, according to an embodiment of the invention in which some functions of the Proxy MIP Gateway are distributed.

In some networks, the functions of a Gateway may be distributed. This scenario is illustrated in FIG. 8. In this example, the functions are implemented in 5 physical boxes, BOXh1, BOXh2, BOXv3, BOXv4, and BOXv5.

BOXh1 and BOXh2 work as PMA functions in the Home Proxy MIP Domain, and BOXv3, BOXv4, and BOXv5 work as HA functions in the Visited Proxy MIP domain. The boxes are linked to each other to exchange roaming traffic.

In such functional distribution, the selection of the Proxy MIP Gateway consists of:
1 Selecting a PMA function from BOXh1 and BOXh2;
2 Selecting a HA function from BOXv3, BOXv4, and BOXv5; and
3 Binding the selected PMA function and selected HA function.

In the example of FIG. 8, a PMA function is selected from BOXh1, and a HA function is selected from BOXv5. Combined, these behave as a PMIP-GW.

For such functional distribution, the set of criteria for the selection can becomes complicate but, on the other hand, an optimized selection becomes possible. For example, by selecting a PMA function (from BOXh1 or BOXh2) that is topologically closest to HAh, and a HA function (from BOXv3, BOXv4, or BOXv5) that is topologically closest to PMA1v, the routing path between the MN and HAh can be optimized, as shown by the thick dotted lines in FIG. 6.

Figure 9:
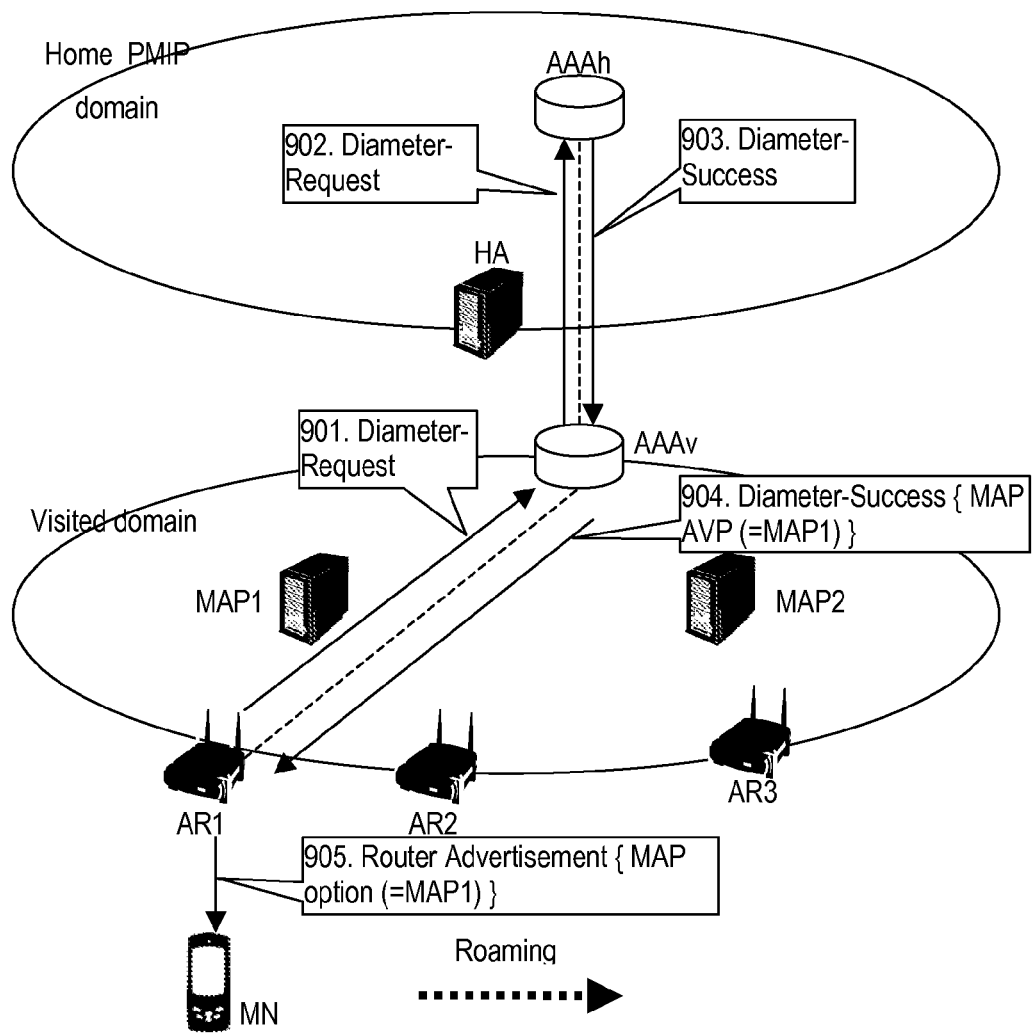
FIG. 9 illustrates schematically the architecture of a Home Proxy MIP network and a Visited Hierarchical Mobile IPv6 domain according to a further embodiment of the invention.

The invention may also be implemented in a Hierarchical Mobile IPv6 network. The basic concept of the selection and provisioning of a Proxy MIP Gateway and modification of an AAA messages by the AAA proxy server can be applied in MAP discovery in HMIPv6. Though MAP is not a gateway of MIPv6, similar principles can be applied. FIG. 9 illustrates an example of invention applied to an HMIPv6 network.

Referring to the numbering of the steps in FIG. 9:

901) An AAA message (Diameter-Request) is sent from Access Router AR1 to AAAv when the MN accesses AR1.

902) The AAA message is forwarded from AAAv to AAAh. There may be further messaging between the MN and AAAh for authentication, but it is not illustrated in FIG. 7 for the sake of clarity.

903) AAAh sends an AAA success message to AAAv when authentication is successful. When receiving the AAA success message, AAAv adds a Mobility Anchor Point (MAP) Attribute value Pair (AVP) to the AAA success message. The selection of a MAP is based on a specific set of criteria. For example, MAP1 is selected in FIG. 7.

904) AAAv sends the AAA success message including "MAP1" as the value of MAP AVP to AR1, as the AAA success message includes the MAP AVP, 905) AR1 sends an IPv6 router advertisement to the MN. The advertisement includes "MAP1" as the value of the MAP option.

The credentials between the MN and MAP1 can be a shared secret key derived from a Master Session Key (MSK) generated by the Extensible Authentication Protocol (EAP). In such cases, a provisioning protocol is necessary between the AAAv and MAP. This protocol may be similar to the protocol used in steps 6 and 8 illustrated in FIG. 5.

If the MN accesses AR3, AAAv may add "MAP2" as the value of MAP APV and "MAP2" may be advertised as the MAP from AR3 based on a specific set of criteria, for example, because the MAP2 is topologically nearer to AR3 than MAP1.

The invention described above has several advantages over the prior art. It reduces the costs of maintaining associations between PMAs and HAs, because there is no need for a PMA to establish a trust relationship with HAs in other network domains. Furthermore, when a MN roams to a Visited network from a closed Home network, it can maintain a secure association with its Home network. The invention has no impact on existing Home Agents, Proxy Mobile Agents, or Mobile Nodes. Furthermore there is no impact on the protocols used, such as the Proxy MIPv6 protocol or the AAA protocols (e.g. Radius, Diameter, 802.1x etc). The same or similar principles can be applied to Proxy MIP (IPv4) and HMIPv6 networks.

It will be appreciated by the person of skill in the art that various modifications may be made to the above described embodiments without departing from the scope of the present invention. For example, whilst the invention is described using the examples of Proxy MIP or PMIPv6, it will be appreciated that it may also be used for any protocol that support gateways or proxy gateways.

The following acronyms have been used in this specification:
AAA Authentication, Authorization, and Accounting
AP Access Point
AR Access Router
AVP Attribute-Value Pair
BA Binding Acknowledgement
BC Binding Cache
BCE Binding Cache Entry
BU Binding Update
BUL Binding Update List
CoA Care-of Address
CN Corresponding Node
COPS Common Open Policy Service Protocol
EAP Extensible Authentication Protocol
GW Gateway
HA Home Agent
HMIPv6 Hierarchical MIPv6
HNP Home Network Prefix
HoA Home Address
IP Internet Protocol
IPv6 IP version 6
LAN Local Area Network
MAP Mobility Anchor Point
MIP Mobile IP
MIPv6 Mobile IPv6
MN Mobile Node
MSK Master Session Key
NAS Network Access Server
PBA Proxy Binding Acknowledgement
PBU Proxy Binding Update
PMA Proxy Mobile Agent
PMIP Proxy Mobile IP
PMIPv6 Proxy Mobile IPv6
SNMP Simple Network Management Protocol
W-LAN Wireless LAN

The invention claimed is:

1. A method of managing roaming of a Mobile Node in a Visited network having a sever, a first Home Agent, and a first plurality of access nodes, the Mobile Node being associated with a Home network having a second Home Agent and a second plurality of access nodes, the method comprising:
the server in the Visited network selecting a Gateway node based on selection criteria, wherein the selected Gateway node belongs to both the Home network and the Visited network and is disposed at the border between the Home network and the Visited network, and wherein the selected Gateway node is configured to emulate the first Home Agent in the Visited network; and
sending a message originating from the server in the Visited network to a first access node from the first plurality of access nodes in the Visited network to which the roaming Mobile Node is attached, the message identifying the selected Gateway node as the first Home Agent in the Visited network.

2. The method according to claim 1, wherein the server is an Authentication, Authorization, and Accounting server.

3. The method according to claim 1, wherein the Gateway node is a Proxy Mobile IP Gateway node, and the first access node is a Proxy Mobile Agent.

4. The method according to claim 1, further comprising:
prior to selecting the Gateway node, the server in the Visited network receiving an authorization message from an Authentication, Authorization, and Accounting server disposed in the Home network, the authorization message comprising an identifier identifying the second Home Agent in the Home network;
the server in the Visited network changing the identifier identify the selected Gateway node; and
the server in the Visited network sending the authorization message with the changed identifier to the first access node.

5. The method according to claim 1, wherein the selection criteria comprise any one of a trust between the Gateway node and the Home network and the distance between the first access node and the Gateway node.

6. The method according to claim 1, wherein functions of the Gateway node are distributed between the Home network and the Visited network, and the selection criteria comprise selection of individual functions.

7. The method according to claim 6, wherein the Gateway node is a Proxy Mobile IP Gateway node, and the functions of the Gateway node include a Home Agent emulation function allowing the Gateway node to emulate the first Home Agent in the visited network.

8. The method according to claim 7, wherein the Gateway node is a Proxy Mobile IP Gateway node, and the functions of the Gateway node include a Proxy Mobile Agent function allowing the Gateway node to emulate a second access node from the second plurality of access nodes in the Home network.

9. The method according to claim 1, wherein the Gateway node is a Mobility Anchor Point and the first access node is an Access Route.

10. The method according to claim 1, further comprising establishing a routing path or tunnel between the first access node and the second Home Agent via the Gateway Node.

11. The method according to claim 1, wherein:
toward the second Home Agent in the Home network, the selected Gateway node behaves as a second access node from the second plurality of access nodes, and
for the first plurality of access nodes in the Visited network, the selected Gateway node behaves as the first Home Agent.

12. The method according to claim 1, wherein the selected Gateway node is trusted by a firewall in the Home network, and wherein all traffic sent to or from the roaming Mobile Node traverses the selected Gateway node.

13. An Authentication, Authorization, and Accounting server for use in a Visited network into which a Mobile Node has roamed, wherein the Visited network has a first Home Agent and a first plurality of access nodes and wherein the Mobile Node is associated with a Home network having a second Home Agent and a second plurality of access nodes, wherein the server comprises a non-transitory machine readable medium comprising instructions which, when executed by associated processor in the server cause the processor, to:
select a Gateway node disposed at the border between the Home network and the Visited network based on selection criteria, wherein the Gateway node belongs to both the Home network and, the Visited network and is configured to emulate the first Home Agent in the Visited network; and
generate and send a message to a first access node from the first plurality of access nodes in the Visited network to which the Mobile Node is attached, the message identifying the selected Gateway node as the first Home Agent in the Visited network.

14. The Authentication, Authorization, and Accounting server according to claim 13, further comprising instructions that cause the processor to:

receive an authorization message from an Authentication, Authorization, and Accounting server disposed in the Home network, the authorization message comprising an identifier identifying the second Home Agent in the Home network; and change the identifier to identify the selected Gateway node, wherein the message sent to the first access node is the authorization message with the changed identifier.

15. The Authentication, Authorization, and Accounting server according to claim 13, further comprising instructions that cause the processor to:

receive an authorization message from a Home Authentication, Authorization, and Accounting server disposed in the Home network;

select a Mobility Anchor Point for use by the Mobile Node attached to the Visited network; and add an Attribute Value Pair to the authorization message prior to transmitting the authorization message to the first access node in the Visited network, wherein the Attribute Value Pair identifies the Mobility Anchor Point.

16. A Gateway node for use in a Proxy Mobile IP network to manage roaming of a Mobile Node in a visited network, wherein the Proxy Mobile IP network includes a home network and the visited network, wherein the home network has a first Home Agent and a first plurality of Proxy Mobile Agents, and wherein the visited network has a second Home Agent and a second plurality of Proxy Mobile Agents, and wherein the Gateway node belongs to both the home network and the visited network and is disposed at the border between the home network and the visited network, the Gateway node is configured to perform the following:

emulate the second Home Agent in the visited network;

receive a registration request originating from an Authentication, Authorization, and Accounting server in the visited network, the request comprising an identifier of the home network or the Mobile Node;

receive a binding update message sent from a Proxy Mobile Agent from the second plurality of Proxy Mobile Agents in the visited network, the binding update message comprising the identifier of the home network or the Mobile Node; and associate the registration request with the binding update message using the identifier of the home network or the Mobile Node.

* * * * *

UNITED STATES PATENT AND TRADEMARK OFFICE
CERTIFICATE OF CORRECTION

PATENT NO. : 8,594,073 B2  
APPLICATION NO. : 12/678252  
DATED : November 26, 2013  
INVENTOR(S) : Sugimoto et al.

Page 1 of 1

It is certified that error appears in the above-identified patent and that said Letters Patent is hereby corrected as shown below:

In the Claims

In Column 10, Line 3, in Claim 4, after "indentifier", insert -- to --.

In Column 10, Line 30, in Claim 9, delete "Access Route" and insert -- Access Router --, therefor.

In Column 10, Line 53, in Claim 13, delete "by associated" and insert -- by an associated --, therefor.

In Column 10, Line 53, in Claim 13, delete "server cause the processor, to:" and insert -- server, cause the processor to: --, therefor.

In Column 10, Line 57, in Claim 13, delete "and, the" and insert -- and the --, therefor.

Signed and Sealed this
Fifteenth Day of July, 2014

Michelle K. Lee
*Deputy Director of the United States Patent and Trademark Office*